United States Patent [19]

Okada

[11] Patent Number: 4,800,388
[45] Date of Patent: Jan. 24, 1989

[54] APPARATUS FOR MEASURING PULSE COMPRESSION RATIO

[75] Inventor: Kozo Okada, Kanagawa, Japan

[73] Assignee: Tokyo Keiki Company, Ltd., Tokyo, Japan

[21] Appl. No.: 699,154

[22] Filed: Feb. 6, 1985

[51] Int. Cl.[4] ............................................. G01S 13/28
[52] U.S. Cl. .................................. 342/194; 342/201; 342/13
[58] Field of Search ................. 343/17.2 PC, 18 E; 342/195, 13, 192, 201, 794, 189

[56] References Cited

U.S. PATENT DOCUMENTS

| | | | |
|---|---|---|---|
| 3,235,867 | 2/1966 | Wirth | 342/195 |
| 3,264,645 | 8/1966 | Hotz | 342/195 |
| 3,680,104 | 7/1972 | Westaway | 342/195 X |
| 3,860,926 | 1/1975 | Gillmer . | |
| 3,897,917 | 8/1975 | Johnson . | |
| 3,967,283 | 6/1976 | Clark et al. | 343/17.2 PC X |
| 3,968,490 | 7/1976 | Gostin | 343/17.2 PC X |
| 4,041,486 | 8/1977 | Hussain | 343/18 E X |
| 4,042,925 | 8/1977 | Albanese et al. . | |
| 4,103,301 | 7/1978 | Evans . | |
| 4,161,732 | 7/1979 | Longuemare, Jr. | 3443/17.2 PC |
| 4,303,921 | 12/1981 | Fitzgerald et al. | 343/18 E |
| 4,328,495 | 5/1982 | Thue . | |
| 4,373,190 | 2/1983 | Lewis et al. | 364/715 |
| 4,379,295 | 4/1983 | Lewis et al. . | |
| 4,384,291 | 5/1983 | Lewis et al. . | |
| 4,404,562 | 9/1983 | Kretschmer, Jr. et al. . | |
| 4,560,961 | 12/1985 | Kestenbaum | 343/17.2 PC X |
| 4,591,857 | 5/1986 | Thor . | |

Primary Examiner—Thomas H. Tarcza
Assistant Examiner—John B. Sotomayor
Attorney, Agent, or Firm—Wenderoth, Lind & Ponack

[57] ABSTRACT

An apparatus for measuring pulse compression ratio which receives a pulse compression radar signal that has been phase-modulated by a two-phase code. The apparatus comprises a means for detecting a function of the number of times of phase inversion existing in the received pulse compression radar signal to obtain the pulse compression ratio corresponding to the function of the number of times of phase inversion.

4 Claims, 2 Drawing Sheets

APPARATUS FOR MEASURING PULSE COMPRESSION RATIO

BACKGROUND OF THE INVENTION

The present invention relates to an apparatus for measuring a pulse compression ratio, and more particularly to an apparatus which receives a high frequency pulse signal emitted from a pulse compression radar using a two-phase coded modulation system, in order to measure the pulse compression ratio.

In recent years, a pulse compression radar having excellent characteristics in distance resolution and sensitivity tends to be widely used. In a military radar warning system or the like, for example, it is required to receive pulse compression radar signals emitted by a plurality of enemy radars, classify each radar signal as to its emitting source, and assume the sort of each emitting source, e.g. the use for the radar.

In a conventional measurement system for this purpose, though factors such as a carrier frequency, a pulse width, etc. of the received radar signal are utilized, these are insufficient for the pulse compression radar, so it is necessary to measure an individual pulse compression ratio of the puluse compression radar and utilize it. However, an apparatus for measuring a pulse compression ratio, which can be used fo classifying the pulse compression radars and assuming the purpose of their use, has not hitherto been provided.

The followings are requirements for the military radar warning apparatus with regard to the pulse compression radar.

First, in the military radar warning system, as it is usual that pulses transmitted from a plurality of radars are received, so pulse train interleaved by pulses from different radar transmitters tend to be received. Therefore, in order to classify each pulse constituting the pulse train as to each transmitter, it is necessary to measure the pulse compression ratio of every one pulse.

Further, in the interleaved pulse train there is quite a possibility that the subsequent pulse may reach immediately after one pulse reached, and hence it is required to complete the measurement of pulse compression ratio for one pulse within its pulse width, and to make ready for measuring pulse compression ratio of the subsequent pulse.

In addition, in case of the military radar warning system installed in a small aircraft such as a fighter, it is strongly desired that the measurement apparatus should be small in size and light in weight.

SUMMARY OF THE INVENTION

An object of the present invention is to provide an apparatus for measuring pulse compression ratio, which is directed to measurement for the pulse compression radar signal phase-modulated in accordance with a two-phase code.

Another object of the present invention is to provide such apparatus which permits the real time measurement of pulse compression ratio in one-to-one correspondence with each pulse of the interleaved pulse train received.

Still another object of the present invention is to provide such apparatus which can be made small in size and light in weight as a measuring apparatus.

These and other objects, features and advantages of the invention will become apparent from the following description taken in connection with the accompanying drawings.

DESCRIPTION OF THE PREFERRED EMBODIMENT

Figure 1:
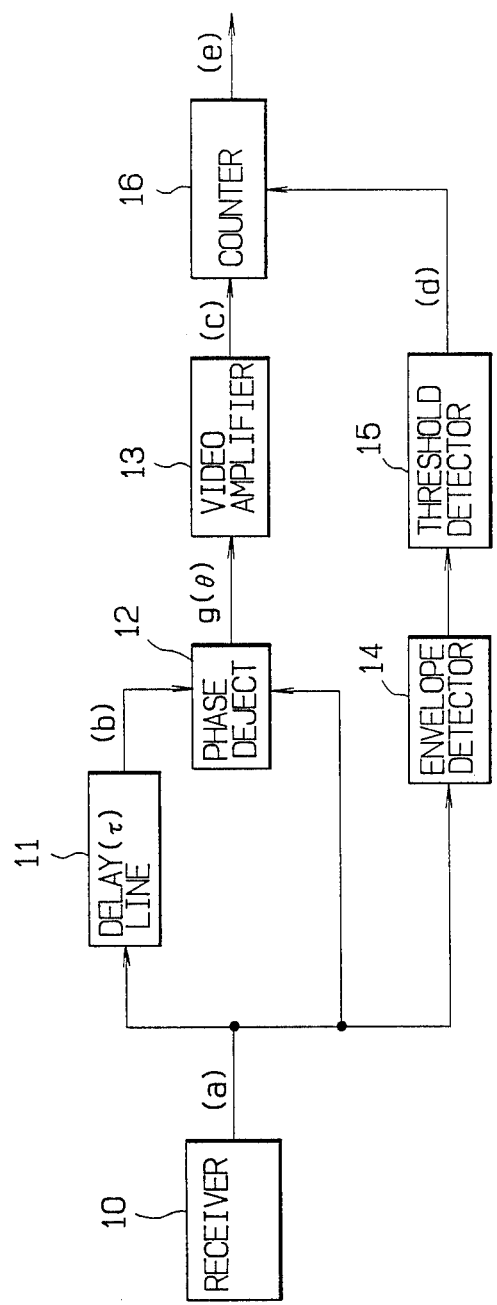
FIG. 1 is a block diagram showing one embodiment of the present invention.

FIG. 1 is a block diagram showing one embodiment of the pulse compression ratio measuring apparatus according to the present invention. The apparatus comprises a receiver 10 for receiving a pulse compression radar signal (hereinafter, referred to an RF pulse) a emitted from a pulse compression radar, a delay line 11 for delaying the received RF pulse a by a predetermined time $\tau$, a phase detector 12 to which a delayed RF pulse b and the non-delayed RF pulse a are inputed, a video amplifier 13, an envelope detector 14 for envelope-detecting the RF pulse a, a threshold detector 15 for obtaining an output d corresponding to a pulse width T of the RF pulse, and a counter 16 for counting an output c of the video amplifier 13 during the output d from the threshold detector 15 is produced.

Figure 2:
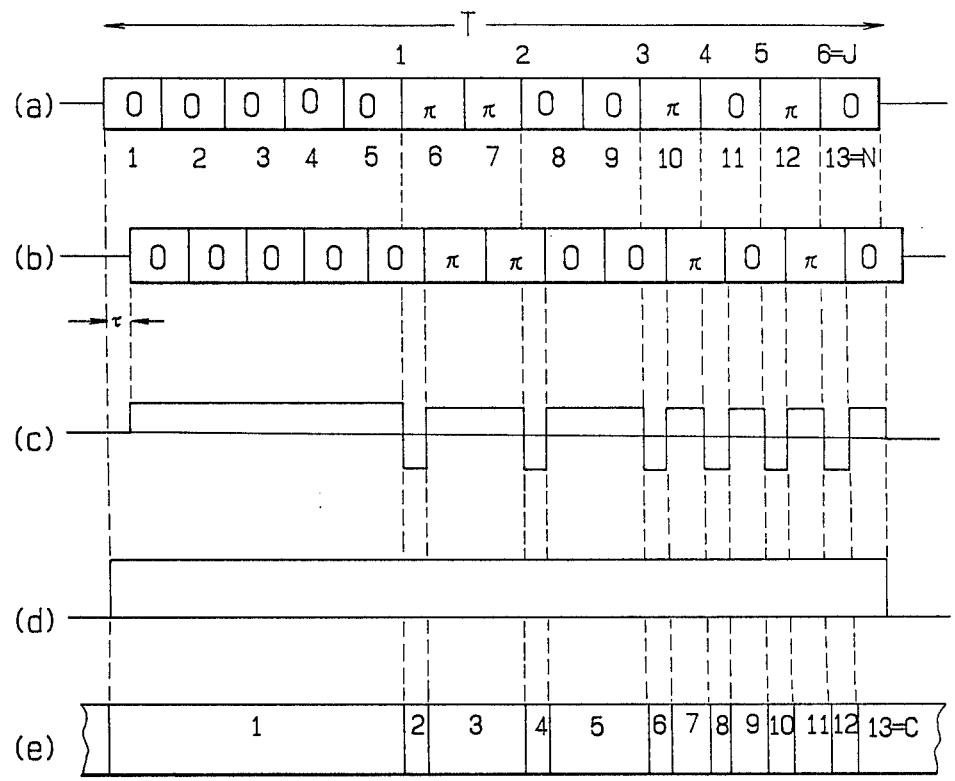
FIG. 2 is a timing chart showing the signals at several points in the embodiment of FIG. 1 and the time relations among the signals.

FIG. 2 illustrates the signals at several points in the embodiment of FIG. 1 and the time relations among the signals. FIG. 2(a) shows an example of the received RF pulse, in which "0" and "$\pi$" indicate the relative phase relations in the RF pulse. FIG. 2(b) shows the output b of the delay line, i.e. the delayed RF pulse, in which "0" and "$\pi$" similarly indicate the relative phase relations in the delayed RF pulse. FIG. 2(c) shows the output c of the video amplifier 13, i.e. a video output signal. FIG. 2(d) shows the output d of the threshold detector 15. Further, FIG. 2(e) shows an output e of the counter 16, in which numbers indicate counting values of digital signal.

Next, the signal phase-modulated in accordance with a two-phase code, i.e. the RF pulse, which is to be measured by the present invention, is considered as a PM signal (phase modulation signal) for explanation below.

The PM signal is a signal which is phase-shifted by 0 or $\pi$ according to the following two-phase finite length series $\{a_n\}$ for pulse width T/N, which is obtained by equally dividing the pulse width T of a coherent RF pulse by N.

$$\{a_n\} = a_0, a_1, \cdots, a_n, \cdots, a_{N-1} \tag{1}$$

where $a_n \in \{1, -1\}$

Here, if each portion of the pulse divided into N is called "unit pulse", then an amount of phase shift of the (n+1)th unit pulse from the first is determined by $a_n$. Namely, it equals $\pi$ (or 0) if $a_n$ is 1 and equals 0 (or $\pi$) if $a_n$ is $-1$.

If a two-phase Barker Code of N=13 is used as an example of the two-phase finite length series $\{a_n\}$ represented by the equation (1), then the PM signal as shown in FIG. 2(a) is obtained.

Next, an operation of the embodiment shown in FIG. 1 is explained below.

First of all, the received PM signal (RF pulse) a is supplied to the phase detector 12, the delayed line 11 and the envelope detector 14.

The PM signal a supplied to the delay line 11 is delayed the delay time $\tau$ and applied to the phase detector 12. The delay time $\tau$ is selected to be shorter than the unit pulse width T/N, that is, $$0 < \rho < T/N \tag{2}$$

The phase detector 12 produces an output amplitude corresponding to a phase difference $\theta$ between the delayed PM signal b and the non-delayed PM signal a.

Here, a phase difference corresponding to the delayed time $\tau$ is given by a product $f\tau$, wherein f is a carrier frequency of the PM signal.

Therefore, between the non-delayed PM signal a and the delayed PM signal b shown in FIGS. 2(a) and 2(b), there is (A) a phase difference $\theta = f\tau$ for the period when both signals are "0" or "$\pi$", or (B) a phase difference $\theta = f\tau \pm \pi$ for the period when one is "0" and the other is "$\pi$".

A phase detector in which the polarity of its output amplitude is inverted when the phase difference between two input signals changes $\pi$, may be used for the phase detector 12.

If an amplitude of this phase detector is represented by $g(\theta)$, wherein $\theta$ is the phase difference between the input signals, then $$g(\theta) = -g(\theta \pm \pi) \tag{3}$$

For instance, $$g(\theta) = A \cos \theta \tag{4}$$

is an example of $g(\theta)$, so a common phase detector is available. Since the phase difference $\theta$ changes $\pi$ when the non-delayed PM signal a or the delayed PM signal b changes from 0 to $\pi$, or from $\pi$ to 0, the polarity of output of the phase detector 12 is inverted, thus the relations among these signals are as shown in FIGS. 2(a), 2(b) and 2(c).

Besides the signal (video signal) which inverts the polarity of output amplitude when the phase difference changes $\pi$, the RF signal is also produced from the phase detector 12. However, the signal as shown in FIG. 2(c) can be obtained by amplifying only a frequency band of the video signal in the subsequent video amplifier 13, and is supplied to the counter 16.

On the other hand, the envelope detector 14 detects an envelope of the PM signal a and supplies it to the threshold detector 15, which outputs a gating signal d if a power level of the PM signal is not less than the threshold level. As shown in FIG. 2(d), the gating signal from the threshold detector 15 coincides with the pulse width T of the PM signal shown in FIG. 2(a).

By applying the gating signal from the threshold detector 15 to the counter 16, the counting control is performed as follows:

First, the counter 16 is reset by the rising of the gating signal d to set its value to 1, and during the subsequent gating period, the counter counts up the number of inversion of the polarity of the video signal shown in FIG. 2(c). At the fall of the gating signal d the counter 16 stops counting. Then the counter 16 holds the number which it counted up during the gating period and outputs the same until rising time of the next gating signal.

In the following description, the count number of the counter 16 obtained by the control of the gating signal d is referred to as "C". The reason why the counting control of the counter 16 is carried out is not only for initially resetting the counter 16 by the rising of the gating signal but also for inhibiting the operation of the counter 16 when no input PM signal exists or when a signal-to-noise ratio is low even if the input PM signal exists, to prevent the uncertain count number C from outputting.

As will be made clear later, the output C of the counter 16 gives a pulse compression ratio (PCR) of the RF pulse to be measured or an approximate value thereof. Further, as is apparent from the above description of the operation, since the counting for obtaining the pulse compression ratio is carried out within the pulse width T of the PM signal, i.e. the gating period, and is completed at least within the pulse width T, it is possible to make ready for measuring the pulse compression ratio of the coming pulse, and thus to measure the pulse compression ratio of the received RF pulse in the real time processing even if a plurality of RF pulses interleaves.

Next, the relation between the count number C of the counter 16 in the embodiment of FIG. 1 and the pulse compression ratio (PCR) is explained in detail.

First, taking notice of a portion in which the contiguous two elements ($a_n$, $a_{n+1}$) differ from each other in the two-phase finite length series $\{a_n\}$ represented by the equation (1), the portion corresponds to the time when the phase is inverted from 0 to $\pi$ or vice versa, and at this time the polarity of the video input to the counter 16 is inverted as mentioned above.

With respect to the delayed PM signal (FIG. 2(b)), as the delay time $\tau$ is selected to be shorter than the unit pulse width T/N in the equation (2), the polarity inversion of the video signal occurs every time of phase inversion and never coincides in time with the polarity inversion due to the non-delayed PM signal.

Therefore, if the number of the portions in which the elements $a_n$ and $a_{n+1}$ differ from each other in the two-phase finite length series $\{a_n\}$ is defined by J, the count number C is the sum of the initially set "1", the number "J" of the phase inversion in the delayed PM signal and the number "J" of the phase inversion in the non-delayed PM signal, hence the count number C is represented by the equation:

$$C = 1 + 2J \tag{5}$$

Furthermore, in the optional two-phase finite length series $\{a_n\}$ the following equation is obtained.

$$N = \frac{1 + 2J}{1 - \rho_{aa}(1)} \tag{6}$$

where N is a length of the series and $\rho_{aa}(k)$ is the autocorrelation function of the series defined by $$\rho_{aa}(k) = \frac{1}{N} \sum_{n=0}^{N-1} a_n a_{n+k}, \ k = 0, \pm 1, \pm 2,$$

where $a_n$ equals 0 for n except 0, 1, - - -, N−1.

The above equation (6) is proved as follows:
In the equation $$N = \frac{1 + 2J}{1 - \rho_{aa}(1)} \tag{6}$$

-continued where $$\rho aa(1) = \frac{1}{N} \sum_{n=0}^{N-1} a_n a_{n+1} \tag{7}$$

$$a_n = \begin{cases} +1 \text{ or } -1 & \text{for } n = 0, 1, 2, \ldots, N-1 \\ 0 & \text{for the other } n\text{'s} \end{cases}$$

$$\{a_n\} = \ldots, 0, 0, a_0, a_1, \ldots, a_n, \ldots, a_{N-1}, 0, 0, \ldots$$

consider the set consisting of the contiguous two elements (except the sets including the element 0), $(N-1)$ sets can be obtained as follows:

$$(a_0, a_1), (a_1, a_2), \cdots, (a_n, a_{n+1}), \cdots, (a_{N-2}, a_{N-1})$$

These sets can be classified into ones each consisting of the elements with different signs and ones each consisting of the elements with identical signs. According to the definition of "J", J sets belong to the former class and hence the remaining $(N-1-J)$ sets belong to the latter class.

A value of $(a_n, a_{n+1})$ is $(-1)$ if the $(a_n, a_{n+1})$ belongs to the former class, or $(+1)$ if it belongs to the latter class. Therefore, the value of $$\sum_{n=0}^{N-1} (a_n a_{n+1})$$

in the equation (7) is $$\sum_{n=0}^{N-1} (a_n a_{n+1}) = (-1)J + (+1)\{(N-1) - J\} \tag{8}$$
$$= N - 1 - 2J$$

Substituting the equation (8) for the equation (7), $$\rho aa(1) = \frac{1}{N}(N - 1 - 2J) \tag{9}$$

is obtained. Solving this equation (9) for N, the above equation (6) is obtained.

If substituting the equation (5) for the equation (6) proved in the foregoing, then the series length N can be represented by $$N = \frac{C}{1 - \rho aa(1)} \tag{10}$$

Meanwhile, when a pulse compression radar is designed, the series in which the value of $|\rho aa(k)|$ is small, where $k \neq 0$, is selected in order to make as less as possible the range sidelobe produced after the pulse compression. It is known that the pulse compression ratio PCR in such case equals to the series length N. That is, as far as the pulse compression radar, $$|\rho aa(k)| << 1 \text{ for } k = \pm 1, \pm 2, \cdots \tag{11}$$

and $$(PCR) = N \tag{12}$$

Therefore, it is noted that the pulse compression ratio PCR, which is obtained by substituting the equation (10) for the equation (12) and considering the equation (11), approximately equals to the count number C. That is, $$(PCR) \cong C \tag{13}$$

Of course, the more $|\rho aa(k)|$ is small, the better the count number C can approximate to the series length N and the more exact pulse compression ratio can be obtained. In the series when $\rho aa(k)$ equals to zero, the count number C exactly provides the pulse compression ratio.

Referring to an example, as $\rho aa(1)$ equals to zero in case of the series shown in FIG. 2, the count number C equals 13 and the exact pulse compression ratio PCR is output.

In case of the series usually used for the pulse compression radar, as $|\rho aa(1)|$ is at most about 0.1, it is possible to measure the pulse compression ratio PCR in a practically allowable precision.

Although the function $(1+2J)$ of the number J of times of the phase inversion is obtained in the above-mentioned embodiment, the number J of times of the phase inversion may be used for obtaining the data of the pulse compression ratio in the alternative embodiment. Further, although the above-mentioned embodiment utilizes the fact that the absolute value of the autocorrelation function for $k=1$ is small, it is also possible to use $$|\rho aa(k)| << 1 \text{ for } k \neq 0$$

in the general series to obtain the similar effect.

Next, considering the constitution of the pulse compression ratio measuring apparatus according to the present invention, it can be realize by the simple circuit structure as shown in FIG. 1, for example, and it does not need larger components in volume and weight. Therefore, in comparison with systems using an autocorrelation analyzer or a spectrum analyzer considered as the other apparatus for measuring the pulse compression ratio, the apparatus of the present invention can be made much smaller and lighter, thus it can satisfy, for example, the requirements of the pulse compression ratio measuring apparatus to be used for the military radar warning system installed mainly in a smaller aircraft.

What is claimed is:

1. An apparatus for measuring a pulse compression ratio comprising:
    an unknown radar signal receiving means for receiving radar signals transmitted from at least one unspecified unknown pulse compression radar; and
    a pulse compression ratio detecting means for detecting a number (J) of phase inversions existing in one pulse of an unknown bi-phase modulated signal whose modulation code sequence is unknown from among the signals received by said unknown radar signal receiving means or for detecting a function of said number of phase inversions;
    wherein a value detected by said pulse compression ratio detecting means is set to a pulse compression ratio (PCR) of said unknown bi-phase modulation code or to an approximate value of said pulse compression ratio.

2. An apparatus according to claim 1, wherein said pulse compression ratio detecting means detects $(1+2J)$ as the pulse compression ratio (PCR) of said unknown bi-phase modulation code or as said approximate value on the basis of the following:

in a binary code sequence $(a_0, a_1, a_2, \ldots, a_{N-1})$:

$$N = \frac{1 + 2J}{1 - \rho_{aa}(k)}$$

wherein the number (J) is the number of times when two adjacent codes in said binary code sequence differ and the length (N) is the length of said binary code sequence and $\rho_{aa}(k)$ denotes an autocorrelation function of the binary code sequence;

in said unknown bi-phase modulation code, the number of phase inversions existing in said one pulse is equal to said number (J) of times when two adjacent codes in the binary code sequence used in said unknown pulse compression radar differ;

in the pulse compression radar, the binary code sequence used has an autocorrelation function $\rho_{aa}(k)$ which satisfies the inequality $\rho_{aa}(k) << 1$, where $k \neq 0$;

the pulse compression ratio (PCR) of said unknown bi-phase modulation code is equal to the length (N) of said binary code sequence used in said at least one unknown pulse compression radar.

3. An apparatus according to claim 2, wherein said pulse compression ratio detecting means comprises:

a delay means for delaying the unknown bi-phase modulated signal from said unknown radar signal receiving means by a predetermined time;

a phase detector to produce a video signal whose polarity is inverted when a phase difference between the bi-phase modulated signal from the unknown radar signal receiving means and the bi-phase modulated signal delayed by said delaying means changes; and a counter for counting a number (2J) of polarity inversions of the video signal from said phase detector and for outputting a function (1+2J) of said count value (2J) as the pulse compression ratio (PCR) of said unknown bi-phase modulated signal or as an approximately value of said pulse compression ratio.

4. An apparatus according to claim 3, further comprising a threshold detector for producing a gate signal corresponding to one pulse width of the unknown pulse compression signal from said unknown radar signal receiving means and for allowing said counter to count for only the period of time of the pulse width of said gate signal.

* * * * *